Aug. 6, 1940.  E. WILDHABER  2,210,273
METHOD OF AND APPARATUS FOR RELIEVING CUTTERS
Filed Sept. 23, 1938  3 Sheets-Sheet 1
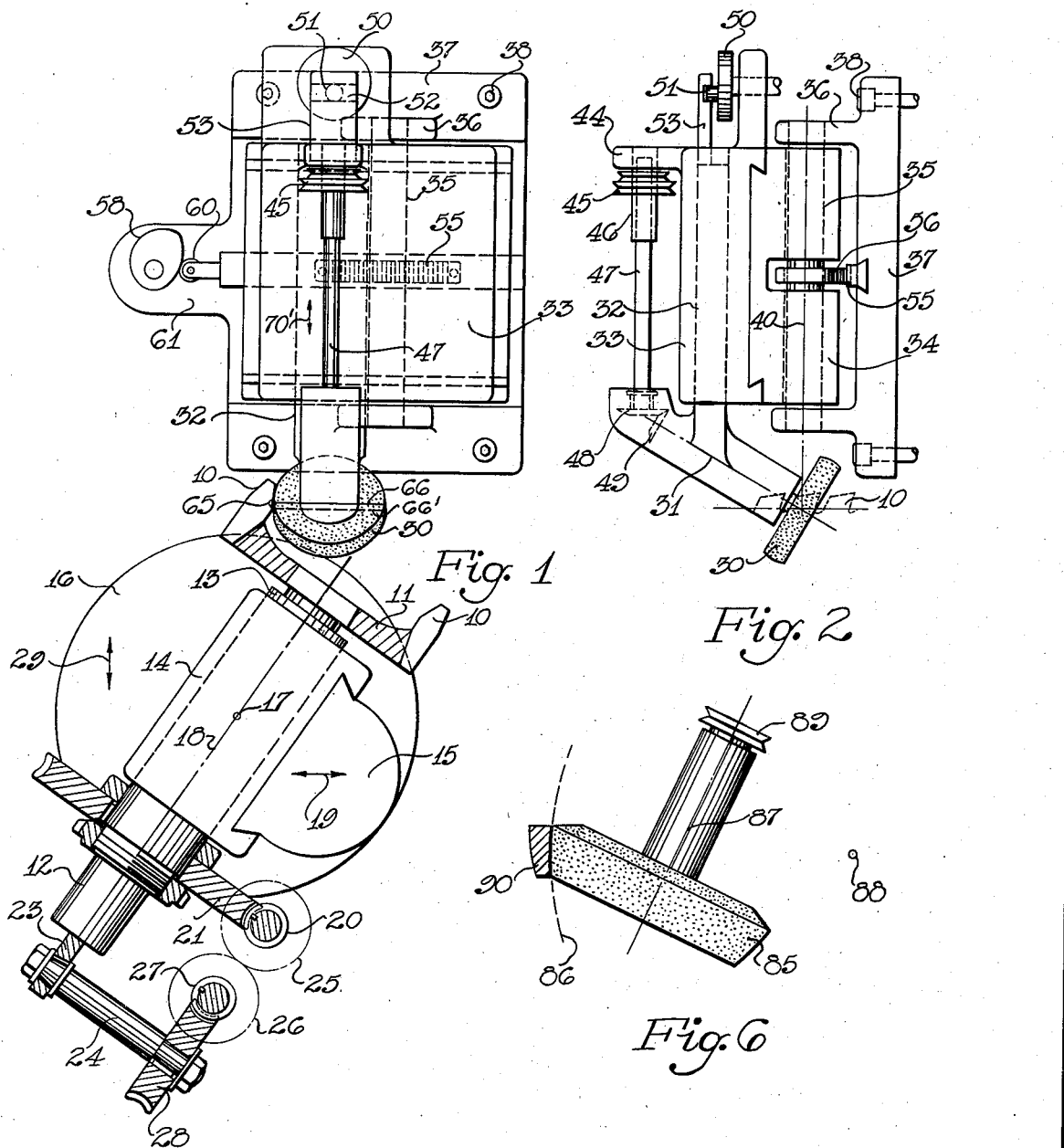
INVENTOR
Ernest Wildhaber
BY
ATTORNEY Aug. 6, 1940.  E. WILDHABER  2,210,273
METHOD OF AND APPARATUS FOR RELIEVING CUTTERS
Filed Sept. 23, 1938   3 Sheets-Sheet 2
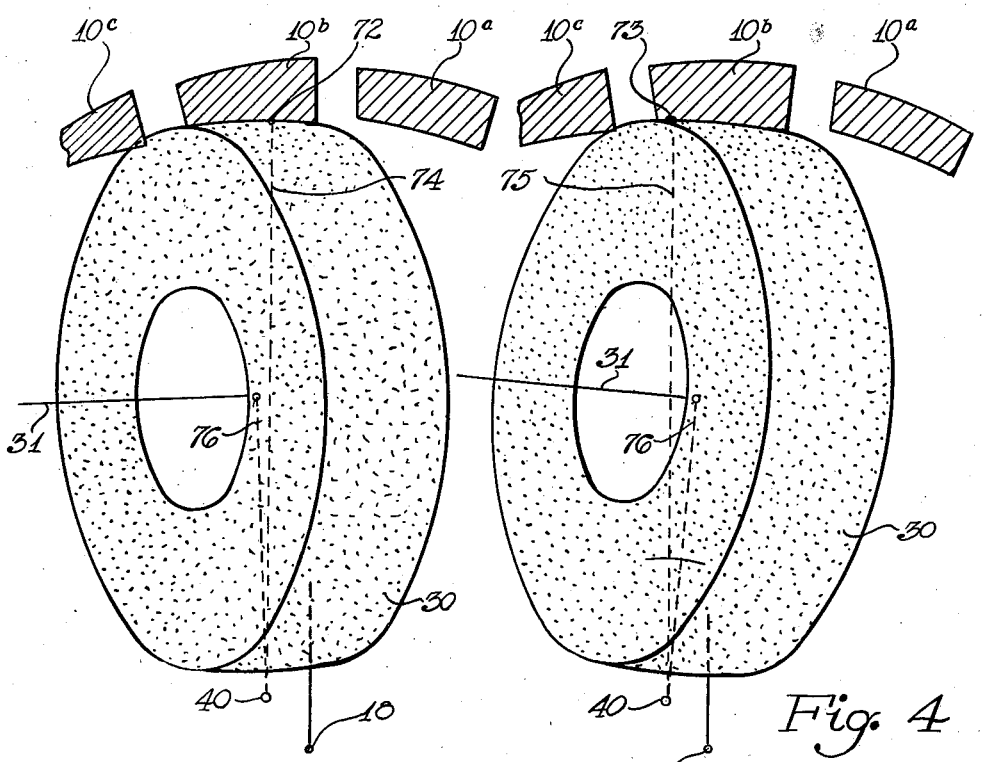
Fig. 3
Fig. 4
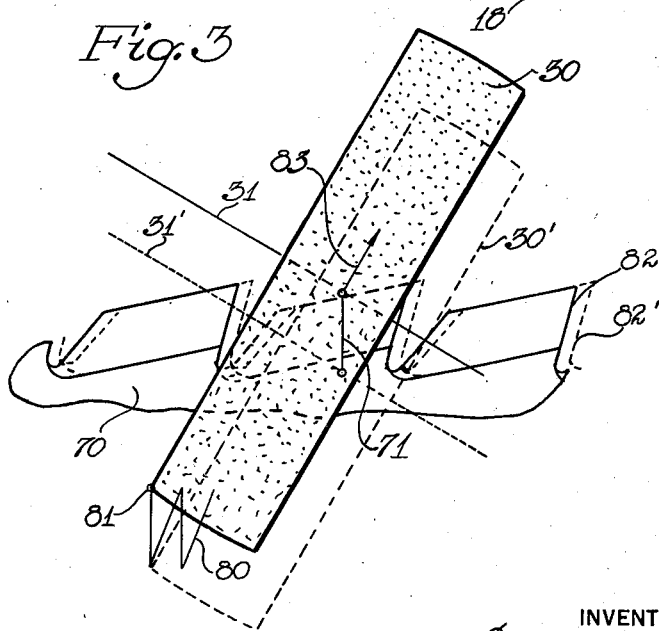
Fig. 5
INVENTOR
Ernest Wildhaber
BY
ATTORNEY Aug. 6, 1940.   E. WILDHABER   2,210,273
METHOD OF AND APPARATUS FOR RELIEVING CUTTERS
Filed Sept. 23, 1938   3 Sheets-Sheet 3

Inventor:
ERNEST WILDHABER
By
Attorney.

Patented Aug. 6, 1940

2,210,273

UNITED STATES PATENT OFFICE 2,210,273

METHOD OF AND APPARATUS FOR RELIEVING CUTTERS

Ernest Wildhaber, Brighton, N. Y., assignor to Gleason Works, Rochester, N. Y., a corporation of New York Application September 23, 1938, Serial No. 231,401

12 Claims. (Cl. 51—288)

The present invention relates to a method and to apparatus for relieving the blades of face-mill gear cutters.

A primary object of the invention is to provide a method and apparatus by which the side surfaces of blades of face-mill gear cutters of segmental or ring-type may be relieved for the full length of the blades.

A further object of the invention is to provide a method and apparatus for relieving the side surfaces of blades of a face-mill gear cutter so that side surfaces will contain straight line elements and the blades will cut more accurately than blades or teeth as relieved by previous relieving processes.

A still further object of the invention is to provide a relieving method suitable for relieving the sides of the cutting blades or teeth of a segmental or of a ring-type face-mill cutter.

Other objects of the invention will be apparent hereinafter from the specification and from the disclosure of the accompanying drawings and the recital of the appended claims.

Heretofore, there have been three general methods employed for producing cutting clearance on the sides of face-mill gear cutter blades. In two of the methods, the blades to be relieved are mounted in a dummy head so that they are displaced out of cutting position in accordance with the clearance angle which is to be produced on the sides of the blades and the clearance is ground by rotating the dummy head past a rotating grinding wheel. In one of these cases, each blade is tilted sidewise out of cutting position and in the other case, each blade is tilted angularly out of cutting position about an axis perpendicular to the cutter axis. It will be obvious that neither of these two methods is suitable for producing side clearance on the blades or teeth of segmental or ring-type cutters. In segmental or ring-type cutters, there are a plurality of blades integral with one another and consequently individual blades cannot be separately tilted out of their cutting positions.

In the third of the methods previously employed for producing clearance on the sides of face-mill cutter blades, the blades to be ground are mounted in their own head and the head is rotated to pass the different blades under a rotating grinding wheel while an axial reciprocating movement is effected between wheel and head once for each blade to be ground. This method can be employed in the grinding of segmental or ring-type cutters but with this method, the sides of the blades can be relieved for only a relatively short distance back of their front faces to avoid having the wheel interfere with one blade of the cutter when it is grinding the preceding blade. With this method, moreover, the side surfaces ground on the blades have a slight profile curvature and this, of course, affects to a greater or less degree the accuracy of the tooth surfaces cut.

In relieving the side surfaces of blades of a cutter by the present invention, a grinding wheel or a milling cutter is employed that has an active surface of circular arcuate profile. A relative relieving motion axially of the cutter is effected between the cutter and the grinding wheel once for each blade of the cutter while the cutter is rotated on its axis and while the wheel is reciprocated in the direction of the height of the cutter blade and simultaneously swung about an axis extending in the direction of its reciprocatory movement. The cutter is adjusted angularly relative to the wheel so that the side surface being ground extends in the direction of reciprocation of the wheel. Thus the wheel can grind the side surface of a blade back for its full length without danger of interference with a following blade. The wheel traces a cylindrical surface in its movement and grinds an involute helicoidal relieved surface on the side of each blade. Such a surface contains straight line elements in planes offset from the cutter axis. With the present invention, then, a blade of increased accuracy can be ground and the side surfaces of the blades can be relieved for their full length from front to rear. Hence the useful life of the blades is very much extended. The invention is not confined to the grinding of blades of straight profile, however, as it may also be used with advantage, as will hereinafter be pointed out more fully, in the grinding of blades of curved profile.

In the drawings:

Fig. 1 is a more or less diagrammatic plan view showing apparatus built according to one embodiment of this invention for relieving blades of a face-mill gear cutter;

Fig. 2 is a side elevational view of the wheel and its mounting and further illustrating the process of the present invention;

Figs. 3 and 4 are diagrammatic views still further illustrating the present relieving method and showing two different positions of the wheel and cutter during the relieving of a blade of a cutter;

Fig. 5 is a side elevational view showing diagrammatically the movement of wheel and cutter in the relieving operation;

Fig. 6 is a more or less diagrammatic view showing a slightly modified form of wheel for grinding cutter blades according to the present invention.

Figure 7:
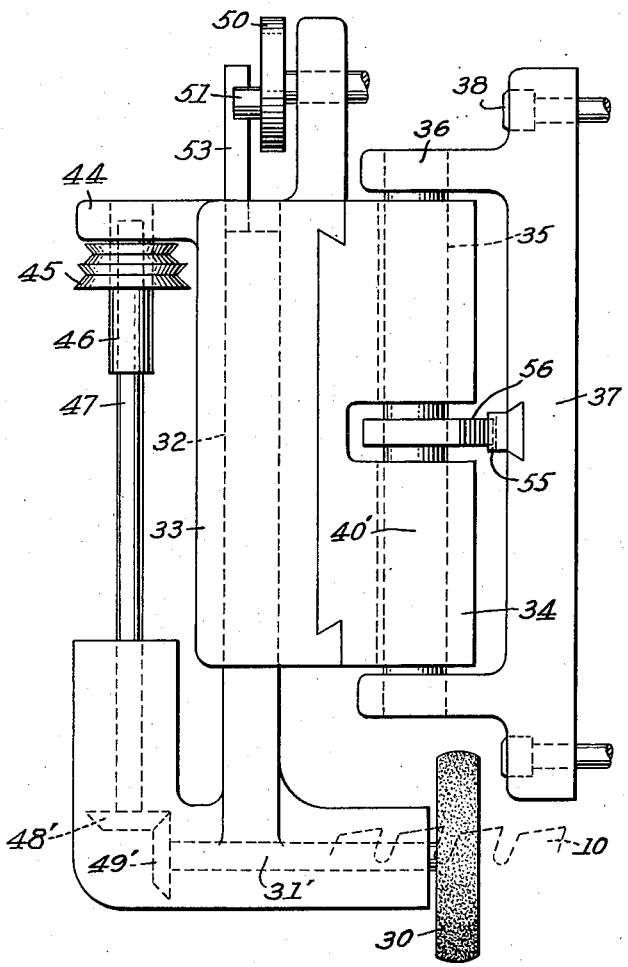
Fig. 7 is a side elevational view similar to Fig. 2 but illustrating another embodiment of the invention.

Referring now to the drawings, 10 denotes the face-mill gear cutter blades whose side-surfaces are to be relieved. For the relieving operation, the blades may be mounted in their own or in a dummy head 11, which is secured to the work spindle 12 of the relieving machine. This work spindle is mounted for axial reciprocating movement in a sleeve 13 which in turn is journaled in a head 14. The spindle has a splined or similar connection with the sleeve.

The head 14 is mounted for vertical adjustment upon a column 15. The column 15 is integral with or otherwise secured to a plate 16. This plate is angularly adjustable about an axis 17 that is perpendicular to the axis 18 of the work spindle. In a machine of the universal type, two linear adjustments at right angles to one another in the directions of the arrows 19 and 29 will also be provided or a linear adjustment in the direction of the arrow 19 and an adjustment in the direction of the work spindle axis 18. The provision of such adjustments are known in the prior types of face-mill cutter relieving grinders and need not further be described here. The plate 16 may, for instance, be mounted on a slide adjustable in the direction of arrow 19 and this slide in turn may be mounted on the base of the machine for adjustment in the direction of arrow 29 or of the work spindle axis 18.

Rotary movement is imparted to the work through the worm 20 and the worm wheel 21. The latter is keyed to the sleeve 13 in which the work spindle is mounted. A reciprocating relieving movement is imparted to the work spindle in time with the work rotation. This is produced by a cam 23 which is secured to a shaft 24 that is driven in time with the worm 20 through the spur gears 25 and 26, the worm 27 and the worm wheel 28. This drive is the same as is employed in the known type of relieving grinder.

For the relieving of the blades a grinding wheel is employed, such as shown at 30, which has an active surface of circular arcuate profile shape. The grinding wheel is secured to a spindle whose axis is denoted at 31 and which is journaled in a slide 32.

The slide 32 is mounted for reciprocating movement in the bore of another slide 33. The slide 33 is mounted on a rocking member or cradle 34 for linear adjustment thereon in a direction at right angles to the direction of movement of the slide 32. Slide 33 and cradle 34 have a dove-tailed connection. The rocking member or cradle 34 is keyed to a shaft or trunnion 35 which is journaled at opposite ends in ears 36 formed integral with a plate 37 that is secured by bolts 38 to the base or frame of the machine.

As is indicated in the drawings, the axis 31 of the grinding wheel is inclined to a plane perpendicular to the axis 40 of swing of the cradle 34 to obtain a more practical mounting of the grinding wheel. If desired, however, the grinding wheel may be so mounted that its axis lies in a plane perpendicular to the axis of the cradle. This construction is illustrated in Fig. 7. Here 31' denotes the axis of the grinding wheel and 40' the axis of the cradle. Here the grinding wheel spindle is driven from the shaft 47 through right angular bevel gears 48', 49'. The other parts shown in Fig. 7 may be identical with similar parts shown in Fig. 2 and are denoted therefore by the same reference numerals as are used in Fig. 2.

The grinding wheel is rotated continuously during the relieving of a cutter from a pulley 45 which is secured to a sleeve 46 that is journaled in a bracket 44 which extends upwardly from the slide 33. The sleeve 46 has a splined, telescoping connection with a shaft 47 which drives the grinding wheel spindle through the bevel gears 48 and 49. The slide 32 may be reciprocated by means of a crank 50 whose pin 51 engages in a slot 52 formed in an arm 53 that extends rearwardly from the slide. The cradle 34 may be oscillated by a rack 55 and spur gear segment 56. The segment 56 may be integral with or secured to the trunnion or shaft 35. The rack 55 has a dovetailed connection with the plate 37 and is mounted thereon for sliding movement. It is reciprocated by a cam 58 that is rotatably mounted on the bracket 61 that is integral with the plate 37 and that engages the follower 60 which is carried by the rack 55. A spring, (not shown) or other suitable means may be provided to hold the follower 60 against the cam 58.

As previously stated, the grinding wheel is dressed to a circular arcuate profile such that in the reciprocating movement of the slide 32, the wheel will describe a cylindrical surface concentric with the axis 40. In grinding the inside surfaces of the blades of a cutter, the grinding wheel contacts internally with said cylindrical surface and has, as shown, a convex profile. For grinding the outside surfaces of the blades of a cutter, the grinding wheel will contact externally with said cylindrical surface and will have a concave profile. For grinding either side of the blades, the plate 16 is adjusted angularly so that the relieved side surface of one of the blades will be parallel to the direction of reciprocation 70 of the wheel. Fig. 1 shows the position for grinding the inside surfaces of the blades.

To grind involute helicoidal relieved surfaces on the sides of the cutter blades, the cutter head 14 is adjusted on the column 15 upwardly or downwardly to offset the axis 18 of the work spindle above or below the axis 40 of swing of the grinding wheel a distance equal to the base radius of the involute helicoidal surface. In other words, the axis of the cutter is offset from the axis of swing 40 of the grinding wheel a distance such that the line of contact between the cylindrical surface, which is traced by the grinding wheel, and the relieved surface to be ground on the blade will be in a horizontal plane parallel to the drawing plane of Fig. 1 and the normals to the relieved surface along said line of contact will constitute a horizontal plane.

In Fig. 1, the grinding wheel is shown at one end of its reciprocating stroke when it contacts at point 65 with the relieved inside surface of one of the cutter blades 10. The cutter is so adjusted that the projected cutter axis will pass either through the point of intersection of the axis 40 with a normal 66 to the relieved side surface at the point 65 or with a line 66' which is close to the normal 66 and parallel thereto. With this arrangement, the cylindrical surface represented by the reciprocating grinding wheel closely approximates the involute helicoidal surface ground on the blades and just clears that surface without interference. The position of the wheel for grinding the outside surfaces of the blades is determined in similar manner.

In operation, the cutter is rotated about its axis 18 by means of the worm wheel 21 and simultaneously reciprocated in the direction of that axis by means of the cam 23. The axial reciprocating movement is imparted to the cutter once for each blade of the cutter to be ground and serves to effect alternately a relieving motion and a quick withdrawal of the cutter from the grinding wheel to initial position ready for relieving of the next following blade of the cutter. During this helical motion of the cutter, the grinding wheel is given a rapid reciprocating motion in the direction 70' by rapid reciprocation of the slide 32 and is turned about axis 40 by movement of the rack 55. As the cutter is withdrawn axially at the end of the relieving motion, the reciprocating grinding wheel is swung back about the axis 40 to starting position, ready to relieve the next following blade of the cutter.

The motions of wheel and cutter head in the relief-grinding operation are illustrated diagrammatically on a somewhat enlarged scale in Figs. 3 to 5 inclusive. The views of Figs. 3 and 4 are taken in a plane perpendicular to the axis 40. The grinding wheel is shown in the act of relieving the inside surface of the middle blade or tooth 10b of three successive cutting blades or teeth 10a, 10b and 10c of a cutting segment or ring 70 of a face-mill gear cutter.

In the grinding operation as already described, the grinding wheel 30 is reciprocated rapidly back and forth in the direction of the height of the side surface of the blade which is being ground and simultaneously is swung slowly about the axis 40 of the cylindrical surface which is to be traced by the wheel. In the reciprocating movement, the grinding wheel is carried from the full line position denoted at 30 in Fig. 5 to the dotted line position denoted at 30', the grinding wheel axis being displaced from the position 31 to the position 31' in the straight line direction denoted by line 71. Simultaneously with this reciprocating movement, the grinding wheel is swung about axis 40. Fig. 3 shows a position of the grinding wheel when the wheel contacts with the relieved side surface of the blade at a point 72 and Fig. 4 shows the position of the wheel when it has been swung about axis 40 through an arc such that the point of contact between the wheel and the side surface of the blade is at 73. 74 and 75 are normals to the points of contact at 72 and 73 and 76 is a line drawn from the center 40 radial of the wheel axis 31. The rapid reciprocating and slow swinging movements of the grinding wheel cause any point of the wheel to travel in a zig-zag path such as shown at 80 in Fig. 5. This zig-zag line 80 denotes the path of movement of the point 81 in the surface of the grinding wheel. All other points in the wheel have a corresponding parallel movement.

Now, as the rapidly reciprocating wheel swings slowly about its axis 40, the cutter head itself is rotated at a uniform velocity on its axis and simultaneously moved at a uniform velocity in the direction of its axis. As a result of this helical motion of the cutter head, the cutting blades or teeth of the segment will be displaced from the full line position indicated at 82 to the dotted line position indicated at 82' in Fig. 5, while the grinding wheel is moving from position 30 to 30'.

When the grinding wheel has ground the side surface of the blade 10b for its full length, or so much of its length as is desired, a spring or other similar means (not shown) acting in conjunction with the cam 23 operates to withdraw the cutter to position the next blade for grinding. Simultaneously the grinding wheel is swung back about the axis 40 to initial position ready for grinding this next blade.

The above-described method is employed for grinding cutter blades of straight profile. By omitting the reciprocating movement of the grinding wheel, however, blades of curved profile may be relief ground.

As is to be seen clearly from Fig. 5, the peripheral cutting direction 83 of the wheel is in the general direction of the height of the blade. This is different from the known face-mill relieving process where the peripheral cutting direction of the grinding wheel is in the direction of the blade length.

The method of the present invention, as will be obvious, may be used for milling the side surfaces of the blades of the cutter as well as for grinding by simply substituting a milling cutter of proper profile shape for the grinding wheel.

In Fig. 6, I have shown how a grinding wheel of slightly modified form may be employed for grinding the side surfaces of cutter blades according to this invention. The wheel 85 here shown is of generally tapered form. It has an active surface whose profile is a portion of the cylindrical surface 86 which is to be represented by the wheel. The wheel shown may be positioned so that its axis 87 lies in a plane perpendicular to the axis 88 of this cylindrical surface instead of being inclined to such plane as is the case with the wheel 30. The taper of the wheel permits of use of a sufficiently long bearing for the grinding wheel spindle to permit of so positioning the wheel. The wheel may be driven by the pulley 89 and may be adjusted in a direction radial of the axis 88 to compensate for wear. The wheel is shown in position for grinding the inside surface of a blade 90. The motions imparted to the wheel and cutter in the relieving operation with the wheel 85 will be the same as those employed in the case of the grinding wheel 30.

The relief-grinding method of the present invention resembles the very successful Gleason spiral bevel and hypoid gear grinding method at present in use inasmuch as rapid passes of the grinding wheel are made over the surface being ground. In each grinding stroke, the wheel traces a surface which approximates the final relieved surface, but there is a mismatch between the cylindrical surface traced by the wheel and the involute helicoidal surface finally produced. This mismatch is of the same order as the mismatch ordinarily employed between mating tooth surfaces of a pair of spiral bevel or hypoid gears. As in the lapping or burnishing of spiral bevel and hypoid gears, the finishing contact sweeps the relieved surface progressively from one end thereof to the other. The consequence is that a very smooth surface finish is obtained on the sides of cutter blades relief ground by the present invention.

While various embodiments of the invention have been illustrated, it will be understood that the invention is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of relieving a side surface of a blade of a face-mill gear cutter which comprises mounting the blade, which is to be relieved, in a rotary head, positioning a rotary relieving tool, that has an active surface of curved profile, in engagement with the side surface of the blade and rotating the tool on its axis while rotating the head on its axis and effecting a relative movement between the tool and blade in a circular arcuate path and simultaneously producing a relative linear movement between the tool and blade in time with the head rotation.

2. The method of relieving a side surface of a blade of a face-mill gear cutter which comprises mounting the blade, which is to be relieved, in a rotary head, positioning a rotary relieving tool, that has an active surface of curved profile, in engagement with the blade and rotating the tool on its axis while moving the tool in a circular arcuate path and simultaneously effecting a bodily relative movement between the tool and blade in the direction of the height of the blade and while rotating the head on its axis producing a relative linear movement between tool and blade in time with the head rotation.

3. The method of relieving a side surface of a blade of a face-mill gear cutter which comprises mounting the blade, which is to be relieved, in a rotary head, positioning a rotary tool which has an active surface of circular arcuate profile in engagement with the side surface of the blade, rotating the tool on its axis, imparting a relative movement between the tool and head about an axis offset from the axis of the head and inclined thereto, and rotating the head on its axis while simultaneously effecting a relative movement between the tool and head in the direction of the axis of the head.

4. The method of relieving a side surface of a blade of a face-mill gear cutter which comprises positioning a rotary tool, which has an active surface of circular arcuate profile, in engagement with the side of the blade, rotating the tool on its axis and effecting a relative reciprocating movement between the tool and blade along a straight line element of the side surface of the blade while producing a relative swinging movement between the tool and blade about an axis parallel to said straight line element and simultaneously rotating the blade under the tool.

5. The method of relieving a side surface of a blade of a face-mill gear cutter which comprises positioning a rotary tool, which has an active surface of circular arcuate profile, in engagement with the side surface of the blade, rotating the tool on its axis, and effecting a relative reciprocating movement between the tool and blade along a straight line element of the side surface of the blade while producing a relative swinging movement between the tool and blade about an axis parallel to said straight line element, and simultaneously effecting a relative helical movement between the tool and blade about an axis offset from and inclined to the axis of said swinging movement.

6. Apparatus for relief-grinding the side surfaces of blades of a face-mill gear cutter comprising a work support, a rotary relieving tool having an active surface of curved profile, means for rotating the tool, means for rotating the work support on its axis, and means for effecting a swinging movement of the tool about an axis inclined to the axis of the tool as the work rotates past the rotating tool.

7. Apparatus for relief-grinding the side surfaces of blades of a face-mill gear cutter comprising a rotary work head, means for securing the blades, that are to be relieved, in the head so that the blades extend in height in the general direction of the axis of the head, a rotary relieving tool having an active surface of curved profile in an axial plane, means for positioning the tool so that the peripheral cutting direction of the tool is in the general direction of the height of a blade, means for rotating the tool, means for rotating the work support on its axis, means for effecting a swinging movement of the tool about an axis perpendicular to the axis of the tool as the work rotates past the rotating tool, and means for simultaneously effecting a relative reciprocatory movement between the tool and the work support axially of the work support in time with the work rotation.

8. Apparatus for relief-grinding the side-surfaces of the blades of a face-mill gear cutter comprising a rotary work support, a rotary relieving tool having an active surface of curved profile, means for rotating the tool, means for imparting a relative helical movement between the tool and work support about the axis of the work support, and means for effecting a relative swinging movement of the tool about an axis inclined to the axis of the tool and offset from the axis of the work support in time with the relative helical movement.

9. Apparatus for relief-grinding the side surfaces of blades of a face-mill gear cutter comprising a rotary work support, a rotary relieving tool having an active surface of circular arcuate profile, means for rotating the tool, means for effecting a swinging movement of the tool about an axis inclined to the axis of the tool and offset from the axis of the work support, means for simultaneously effecting a relative reciprocating movement between the tool and work support in the direction of said offset axis, and means for simultaneously producing a relative helical movement between the tool and work support about the axis of the work support.

10. Apparatus for relief-grinding the side surfaces of blades of a face-mill gear cutter comprising a work support, a rotary relieving tool of generally tapered form that has an active surface of circular arcuate profile, a rotary work support, means for rotating the tool, means for effecting a relative helical movement between the tool and work support, and means for swinging the tool about an axis perpendicular to the tool axis in time with said relative helical movement.

11. The method of relieving a side surface of a blade of a face-mill gear cutter which comprises positioning a rotary relieving tool, which has an active surface that is a surface of revolution of curved profile, in engagement with the side surface of the blade in such manner that the peripheral cutting direction of the tool is in the general direction of the height of said blade, and rotating said relieving tool on its axis while effecting a periodic helical relative motion between the gear cutter and said tool about the axis of the gear cutter, and simultaneously swinging the tool about an axis extending in the direction of the height of the blade.

12. The method of relieving a side surface of a blade of a face-mill gear cutter which consists in providing a rotary relieving tool having an active surface arranged as a surface of revolution of curved profile adapted to contact with the side surface of the blade, in effecting engagement between said rotary tool and said side surface in such manner that the peripheral cutting direction of the tool is in the general direction of the height of said blade, in effecting a periodic helical relative motion between the gear cutter and said tool about the axis of the gear cutter, in simultaneously producing a relative reciprocatory movement between the tool and the blade in the direction of height of the blade, and in simultaneously swinging the tool about an axis extending in the direction of said reciprocatory movement.

ERNEST WILDHABER.